(12) United States Patent
Uppala et al.

(10) Patent No.: US 11,336,595 B2
(45) Date of Patent: May 17, 2022

(54) REPLAY OF CONVERSATIONS FOR TASK COMPLETION AND DELEGATION

(71) Applicant: Microsoft Technology Licensing, LLC, Redmond, WA (US)

(72) Inventors: Anantha Deepthi Uppala, Mercer Island, WA (US); Chetan Bansal, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/913,131

(22) Filed: Jun. 26, 2020

(65) Prior Publication Data
US 2020/0328991 A1 Oct. 15, 2020

Related U.S. Application Data

(62) Division of application No. 15/663,126, filed on Jul. 28, 2017, now Pat. No. 10,742,571.

(51) Int. Cl.
*H04L 12/58* (2006.01)
*H04L 51/02* (2022.01)
*G06Q 10/10* (2012.01)
*G06Q 50/30* (2012.01)
*G06F 40/35* (2020.01)
(Continued)

(52) U.S. Cl.
CPC ........ *H04L 51/02* (2013.01); *G06F 16/24578* (2019.01); *G06F 40/284* (2020.01); *G06F 40/295* (2020.01); *G06F 40/35* (2020.01); *G06F 40/56* (2020.01); *G06Q 10/063114* (2013.01); *G06Q 10/107* (2013.01); *G06Q 50/30* (2013.01); *H04L 51/16* (2013.01); *H04L 51/18* (2013.01); *G06F 3/0482* (2013.01); *H04L 51/04* (2013.01)

(58) Field of Classification Search
CPC ......... H04L 51/02; H04L 51/16; H04L 51/18; H04L 51/04; G06F 17/2881; G06F 17/279; G06F 16/24578; G06F 17/277; G06F 17/278; G06F 3/0482; G06Q 10/107; G06Q 50/30; G06Q 10/063114
See application file for complete search history.

(56) References Cited

U.S. PATENT DOCUMENTS

| 2012/0058455 | A1* | 3/2012 | Lawrence | G09B 19/02 434/112 |
| 2015/0066479 | A1* | 3/2015 | Pasupalak | G06F 40/40 704/9 |
| 2016/0344663 | A1* | 11/2016 | Hwang | H04L 51/04 |

\* cited by examiner

*Primary Examiner* — Kim T Nguyen
(74) *Attorney, Agent, or Firm* — Schwegman Lundberg & Woessner, P.A.

(57) ABSTRACT

A system is configured to replay a selected conversation with a selected agent. The selected conversation may be selected from a plurality of previously conducted conversations with other agents. The selected agent may be selected from a plurality of available agents. The system determines various tasks, named entities, and user preferences from the selected conversation. During a replay of the selected conversation with the selected agent, the system generates responses to messages received from the selected agent based on the determined tasks, named entities, and user preferences. The system also allows a user to select whether the replayed conversation should be conducted in a passive mode or in an active mode. In a passive mode, the system generally conducts the replayed conversation autonomously whereas, in an active mode, the system requests user input before sending a response to the selected agent.

20 Claims, 9 Drawing Sheets

(51) Int. Cl.
*G06F 40/56* (2020.01)
*G06F 40/284* (2020.01)
*G06F 40/295* (2020.01)
*G06F 16/2457* (2019.01)
*G06Q 10/06* (2012.01)
*H04L 51/00* (2022.01)
*H04L 51/18* (2022.01)
H04L 51/04 (2022.01)
G06F 3/0482 (2013.01)

REPLAY OF CONVERSATIONS FOR TASK COMPLETION AND DELEGATION

CROSS-REFERENCE TO RELATED APPLICATIONS

This application is a divisional of prior application Ser. No. 15/663,126, filed on Jul. 28, 2017, which is incorporated by reference herein in its entirety.

TECHNICAL FIELD

Example embodiments of the present application generally relate to, but are not limited to, replaying one or more conversations for task completion and delegation and, in particular, to using prior conversations with one or more conversational chatbots to perform current tasks that may be repetitive or similar to the tasks associated with the prior conversations.

BACKGROUND

Many companies have implemented conversational chatbots that interact with customers through a messaging application or other conversational chatbot interface (e.g., a web interface accessible via a web browser). In general, a conversational chatbot is a computer program that sends messages to a customer and appears as if the conversational chatbot is a human customer service representative. Because the conversational chatbot may have some logic or artificial intelligence, the customer can interact with the conversational chatbot and engage in services provided by the company or perform other tasks. The conversational chatbot provides a means by which to interact with a computer program or application, but to do so in a way that seems familiar or colloquial.

Because competing companies may implement similar conversational chatbots, it is not uncommon for the customer to perform the same repetitive operations with, or send similar messages to, multiple different conversational chatbots. In some circumstances, these repetitive operations or messages can occur simultaneously or within a short period of time (e.g., attempting to make last-minute reservations at multiple restaurants). In other circumstances, these repetitive operations or messages may occur periodically or at established time intervals (e.g., the same operation or task is performed on a weekly or daily basis). As the operations or messages are repetitive, the customer loses a non-trivial amount of time having to repeat himself or herself for each of the conversational chatbots.

BRIEF DESCRIPTION OF THE DRAWINGS

Various ones of the appended drawings merely illustrate example embodiments of the inventive concepts presented herein, and cannot be considered as limiting its scope.

DETAILED DESCRIPTION

Figure 1:
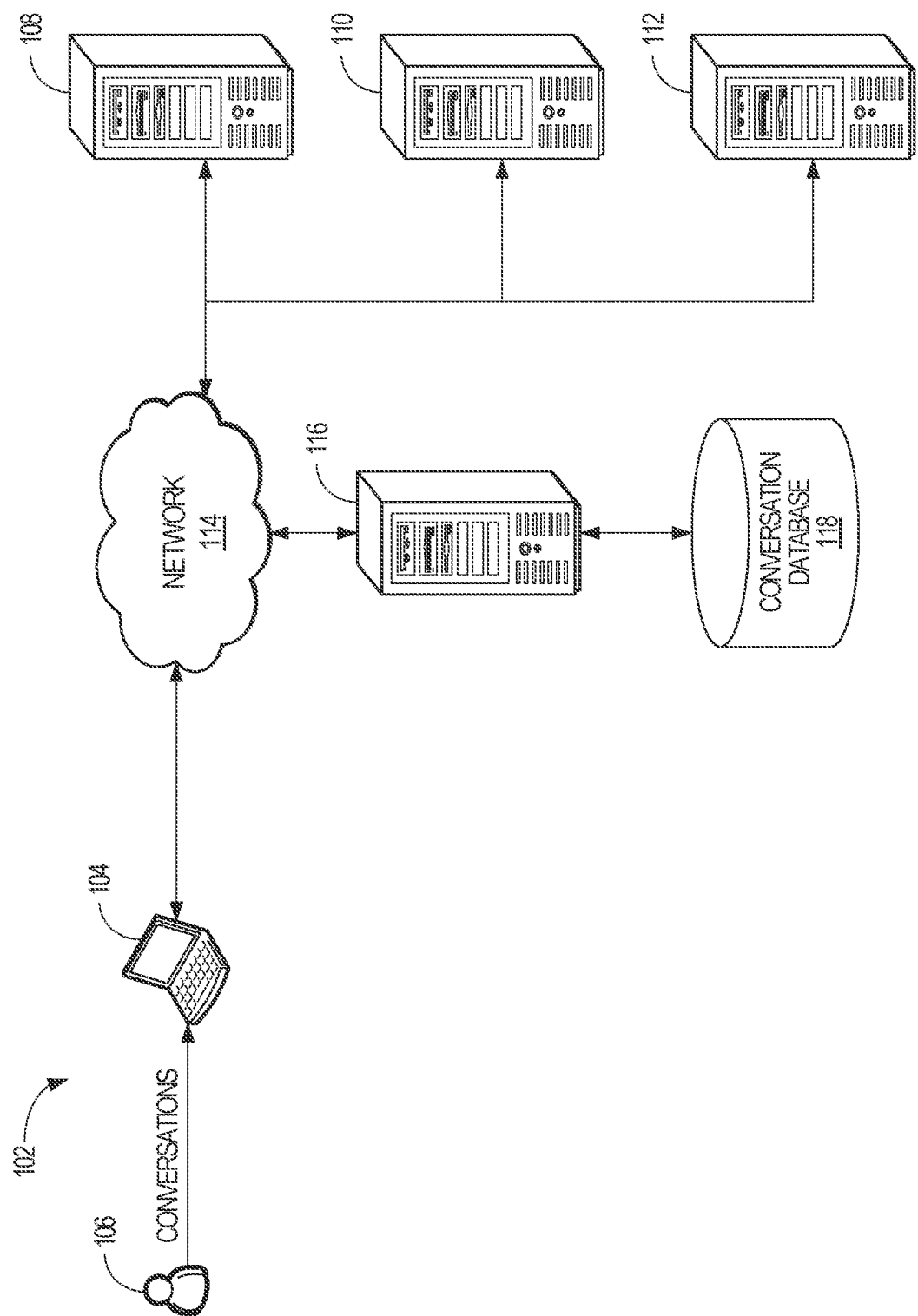
FIG. 1 is an architecture diagram illustrating a client device in communication with various conversational chatbot servers in accordance with an example embodiment.

Aspects of the present disclosure involve systems and methods for replaying one or more previous conversations associated with one or more task that are similar to a task that can be performed by a conversational chatbot. The previous conversations may have been conducted prior in time with the same or another conversational chatbot or with another entity, such as a human customer service representative. The prior conversations may include audio, text, or combinations thereof. In one implementation, an audio conversation is converted to a text transcript via one or more speech transcription techniques. A prior conversation may be deconstructed into various conversational attributes, such as task(s), named entities, and user preference(s). The task may indicate the objective that the user is attempting to accomplish during a given conversation, such as arrange a flight, schedule a reservation, order food, set up a recording, or other such task. The named entities may indicate the values or answers to various questions that a conversational chatbot may ask the user. Examples of named entities include a seat number (e.g., for a flight), a day of week (e.g., Monday, Tuesday, Wednesday, etc.), a date in a particular format (e.g., MM/DD/YYYY or YYYY/MM/DD), a noun that answers a particular question (e.g., "pizza," "booth," "table," "concert," etc.), a proper noun (e.g., "Dallas," "Redmond," "Paris," etc.), and other such named entities or combinations thereof. Finally, a user preference may indicate an adjective or descriptor associated with the noun, such as a "shortest," "cheapest," "cheese" (in describing a pizza), "tallest," "fastest," "row," "aisle," or other such adjective or descriptor.

In performing the replaying of a conversation with a conversational chatbot or other entity (such as a customer service representative), the user initially selects a conversation to be replayed. The conversations may be displayed within a user interface displayed on a display device of a computing device. For example, the user may select (e.g., tap on a touch screen) a conversation or one or more messages from a conversation history that he or she desires to be replayed. The user may select such messages from one or more conversations that the user previously had.

The user then selects one or more entities to which that they want to replay the conversation. In this context, the term "entity" is contemplated as covering both automated and non-automated entities, such as conversational chatbots (automated) and customer service representatives (non-automated). However, there may be instances where the selectable entity may only be automated entities or non-automated entities. In one embodiment, the conversation that is replayed is replayed on a per message basis; that is, each message from the conversation is communicated to the entity with the expectation that the entity responds to the message. In another embodiment, the entirety of the conversation is communicated to the entity. As one entity may respond differently to the replayed messages than another entity, this disclosure contemplates performing various operations that map the replayed conversation to the selected entity. This mapping is to ensure that the selected entity understands the replayed conversation similar to how the original entity understood the conversation when it initially took place.

The conversation that is replayed may be performed in one of two selectable modes: a passive mode or an active mode. In a passive mode, the user allows various replaying conversation modules and/or applications to drive the conversation on the user's behalf without much, if any, additional user input. In some instances, the user may be prompted to provide some input when there is an input missing or when disambiguation or consent is needed. For example, the user may be prompted to provide missing information, some disambiguation as to a particular word or phrase, or for consent and/or authorization In contrast, the active mode allows the user to lead the conversation and the replaying conversation modules/applications suggests responses (based on previous conversation) available to the user, at each turn of the conversation, which the user may use or reject. Unlike the passive mode, the active mode prompts the user for each response communicated to the selected entity during the replay of the selected conversation.

Depending on the user's choice of active or passive mode, the replaying conversation modules and/or applications interact with the selected entity to enable task completion and delegation with corresponding user experience.

Example scenarios illustrate some of the benefits of the disclosed replay mechanism. Suppose that a first user wants to make a last-minute restaurant reservation for a large party of fifteen people. Given that most restaurants might not have an opening for such a large table, the user checks with many different restaurants. Where the interaction may occur over text through conversational interfaces or chatbots, the user would have to have a similar conversation multiple times, once with each restaurant.

In another example, suppose that a second user has ordered pizza using a conversational chatbot for a first restaurant. To order pizza again next week at another restaurant, the user would have to have the same or similar conversation again including providing pizza details, delivery address and phone number.

In yet a third example, suppose that a third user schedules time with the user's hairstylist every few months. The user calls the receptionist, gives his or first and last name, the stylist the user usually sees and asks for next available appointments. This user does this each time the user would have to schedule an appointment.

In each of the foregoing examples, the user experience could be vastly improved, and a non-trivial amount of time saved, if the user could replay parts or whole of the original conversation and can step in on an as-needed basis.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

FIG. 1 is an architecture diagram 102 illustrating a client device 104 in communication with various conversational chatbot servers 108-112 in accordance with an example embodiment. The client device 104 is also in communication with a conversation processing server 116 that processes and/or stores the conversations performed by the user 106. To avoid obscuring the inventive subject matter with unnecessary detail, various functional components (e.g., modules and engines) that are not germane to conveying an understanding of the inventive subject matter have been omitted from FIG. 1. However, a skilled artisan will readily recognize that various additional functional components may be supported by the client device 104 and/or the conversation processing server 116 to facilitate additional functionality that is not specifically described herein.

While the client device 104, the conversation processing server 116, and the conversational chatbot servers 108-112 are arranged as a client-server architecture, the disclosed subject matter is, of course, not limited to such an architecture, and could equally well find application in other architectures, such as an event-driven, distributed, or peer-to-peer architecture system. Further, the various functional components of the client device 104 may be implemented as standalone systems or software programs, which do not necessarily have networking capabilities. Moreover, it shall be appreciated that although the various functional components of the client device 104 are discussed in the singular sense, multiple instances of one or more of the various functional components may be employed. Furthermore, one or more of the functionalities and/or operations that are performed by the client device 104 may be instead performed by the conversation processing server 116 and vice versa. In this manner, the client device 104 and the conversation processing server 116 cooperate in the client-server architecture.

The client device 104 may comprise, but is not limited to, a mobile phone, desktop computer, laptop, portable digital assistant (PDA), smart phone, tablet, ultra book, netbook, laptop, multi-processor system, microprocessor-based or programmable consumer electronic system, or any other communication device that a user 106 may use. In some embodiments, the client device 104 may comprise a display module (not shown) to display information (e.g., in the form of user interfaces). In further embodiments, the client device 104 may comprise one or more of touch screens, accelerometers, gyroscopes, cameras, microphones, global positioning system (GPS) devices, and so forth.

The client device 104 may include one or more applications (also referred to as "apps") such as, but not limited to, an operating system, a web browser, an electronic mail (email) application, and a messaging application configured to interact with the chatbots implemented by the various conversational chatbot servers 108-112. The messaging application may be further configured to interact with the various applications being executed by the client device 104. The messaging application may be configured to receive input from the user 106 and to initiate one or more conversations with the implemented chatbots.

In interacting with the messaging application, the user 106 may provide messages and/or input using a hardware or software-based keyboard, via speech using a microphone or other suitable audio input device, or a combination thereof. Where the message (input) is verbal, the messaging application may generate a transcript of the message via one or more speech recognition techniques, such as hidden Markov models, dynamic time warping, one or more neural networks, or combinations of the foregoing techniques. Where the message (input) is in text, the messaging application may store the text in a local machine-readable memory of the client device 104. Upon completion of the conversation, the messaging application may communicate the completed conversation to the conversation processing server 116, which processes the completed conversation and stores the completed conversation in a conversation database 118. In some instances, the completed conversation may be locally stored on the client device 104 for a predetermined time period and, upon expiration of the time period, then uploaded to the conversation database 118 for longer time storage. In yet another alternative embodiment, the client device 104 performs the functionalities of the conversation processing server 116 and stores the completed conversations on a local machine-readable memory of the client device 104.

In one embodiment, the client device 104 communicates with the conversational chatbot servers 108-112 and/or the conversation processing server 116 via a network 114. The network 114 may include an ad hoc network, an intranet, an extranet, a virtual private network (VPN), a local area network (LAN), a wireless LAN (WLAN), a WAN, a wireless WAN (WWAN), a metropolitan area network (MAN), a portion of the Internet, a portion of the Public Switched Telephone Network (PSTN), a cellular telephone network, a wireless network, a Wi-Fi® network, a WiMax network, another type of network, or a combination of two or more such networks.

The conversational chatbot servers 108-112 are each configured to provide one or more conversational chatbots that offer access to one or more goods and/or services provided by a company associated with each of the conversational chatbots. As the user 106 interacts with a selected conversational chatbot via the client device 104, the user 106 and the conversational chatbot exchange individual messages, where the individual messages are collectively considered the "conversation." As mentioned previously, the conversational chatbot servers 108-112 may also provide a messaging application for a human customer service representative to interact with the user 106, in which case, the conversation with the human customer service representative is also stored for later retrieval, either in the client device 104 or in the conversation database 118.

In one embodiment, the conversation processing server 116, the conversational chatbot servers 108-112, and the client device 104 communicate via one or more application programming interfaces (API) that provides functions and services for the client device 104 to send messages and/or conversations to the conversation processing server 116 and/or the conversational chatbot servers 108-112. In addition, the client device 104 may configured with a local and/or dedicated API that instructs it to register to receive the messages from the user 106.

Although the client device 104 and the conversation processing server 116 are illustrated as being separate entities in FIG. 1, the conversation processing server 116 may be instantiated on the client device 104 (or vice versa). Where the conversation processing server 116 is instantiated as a background service on the client device 104, the conversation processing server 116 registers with the operating system of the client device 104 to receive data from other applications and/or client device 104 modules.

The conversation database 118 is configured to store one or more conversations that the user 106 conducts with the conversational chatbots, whether that conversation is actively automated by the client device 106, passively automated by the client device 106, or performed by the user 106. The conversation database 118 may be implemented as one or more types of databases including, but not limited to, a hierarchical database, a relational database, an object-oriented database, one or more flat files, or combinations thereof.

In addition to the conversations, the conversation database 118 may also store a knowledge graph of the various conversational attributes derived from each of the conversations that the user 106 conducted with the various conversational chatbots. In one embodiment, the knowledge graph is constructed as a two-dimensional table, where rows of the two-dimensional table represent a message (or conversation), and each column represents a conversational attribute. Thus, by referencing the knowledge graph (and as discussed further below), the client device 104 can automatically generate potential responses to messages received from the conversational chatbots that mirror a prior conversation the user 106 may have conducted previously.

Figure 2:
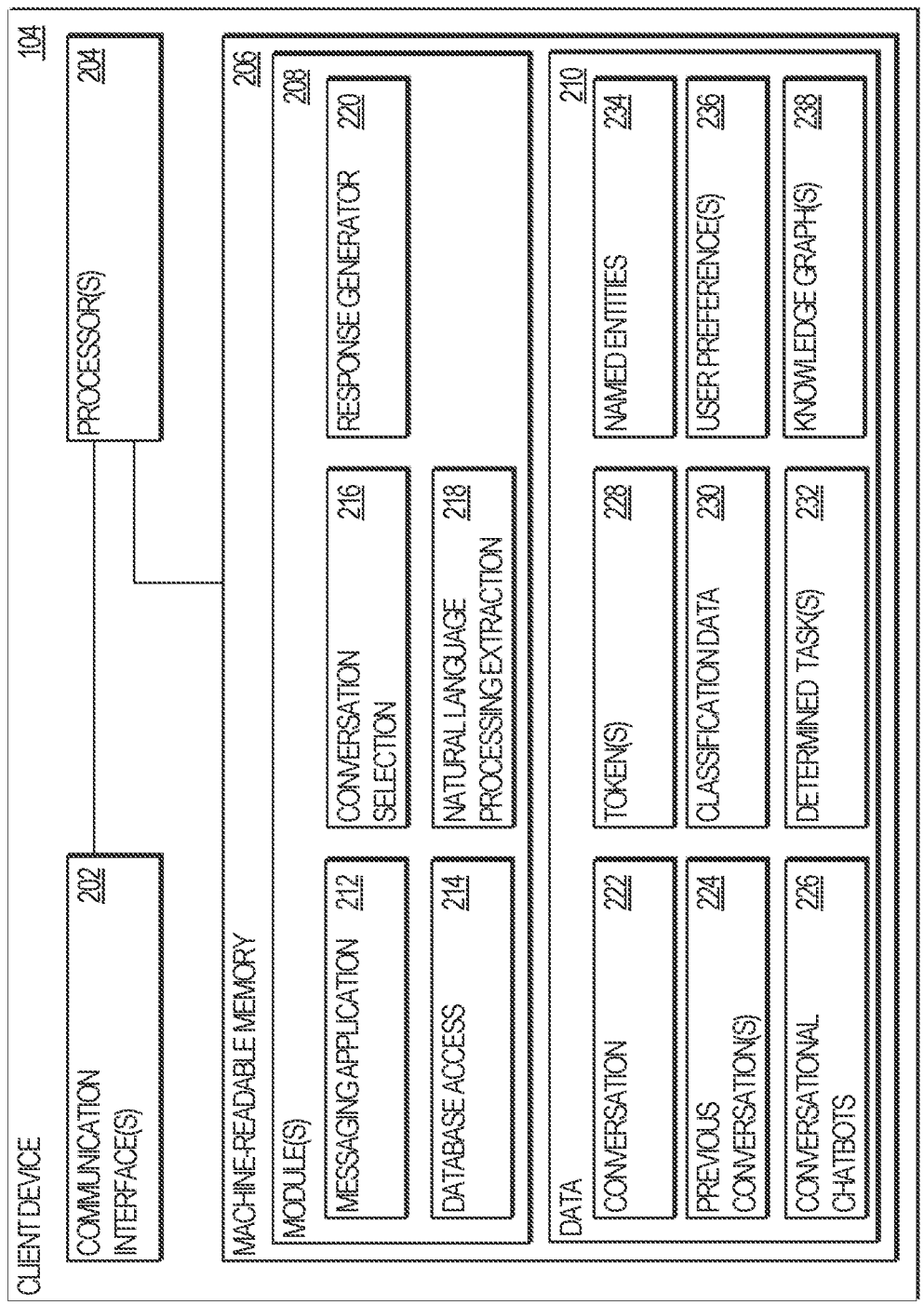
FIG. 2 is a block diagram of the client device illustrated in FIG. 1, according to an example embodiment, configured to communicate with one or more of the conversational chatbot servers.

FIG. 2 is a block diagram of the client device 104 in FIG. 1, according to an example embodiment, configured to exchange messages with one or more of the conversational chatbot servers 108-112. As illustrated in FIG. 2, the client device 104 includes various modules to perform the processing of the conversations with the conversational chatbots. Thus, in this embodiment, the conversation processing server 116 may be used for long-term storage of one or more of the conversations. In alternative embodiments, one or more of the modules illustrated in FIG. 2 may be instantiated by the conversation processing server 116. Instantiating one or more of the modules illustrated in FIG. 2 on the conversation processing server 116 offloads some of the processing performed by the client device 104, thus freeing the client device 104 to perform other tasks and/or operations.

In one embodiment, the client device 104 includes one or more processors 204, one or more communication interface(s) 202, and a machine-readable memory 206. The various functional components of the client device 104 may reside on a single computer, or they may be distributed across several computers in various arrangements. The various components of the client device 104 may, furthermore, access one or more databases, and each of the various components of the client device 104 may be in communication with one another. Further, while the components of FIG. 2 are discussed in the singular sense, it will be appreciated that in other embodiments multiple instances of the components may be employed.

The one or more processors 204 may be any type of commercially available processor, such as processors available from the Intel Corporation, Advanced Micro Devices, Texas Instruments, or other such processors. Furthermore, the one or more processors 204 may be of any combination of processors, such as processors arranged to perform distributed computing. In one embodiment, the one or more processors 204 are implemented as hardware processors. In another embodiment, the one or more processors 204 are implemented as software processors.

The one or more communication interface(s) 202 may be configured to send and/or receive communications among the various entities illustrated in FIG. 1, such as the conversation processing server 116 and one or more of the conversational chatbot servers 108-112. In this regard, the one or more communication interface(s) 202 may be a wired interface, such as an Ethernet interface, a wireless interface, such as an 802.11g/n interface, or a combination of wired and wireless interfaces.

The machine-readable memory 206 includes various modules 208 and data 210 for implementing the features of the conversation processing server 116. The machine-readable memory 206 includes one or more devices configured to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable memory" should be taken to include a single medium or multiple media (e.g., a centralized or distributed database, or associated caches and servers) able to store the modules 208 and the data 210. Accordingly, the machine-readable memory 206 may be implemented as a single storage apparatus or device, or, alternatively and/or additionally, as "cloud-based" storage systems or storage networks that include multiple storage apparatus or devices.

The module(s) 208 may include one or more applications and/or modules 212-220. As is understood by skilled artisans in the relevant computer and Internet-related arts, each of the components 212-220 (e.g., a module, engine, and/or application) may represent a set of executable software instructions and the corresponding hardware (e.g., memory and processor) for executing the instructions. In one embodiment, the module(s) 208 include a messaging application 212, a database access module 214, a conversation selection module 216, a natural language processing extraction (NLP) module 218, and a response generator 220. In one embodiment, the modules 208 are written in a computer-programming and/or scripting language. Examples of such languages include, but are not limited to, C, C++, C#, Java, JavaScript, Perl, Python, Ruby, or any other computer programming and/or scripting language now known or later developed.

The module(s) 208 may interact with data 210 stored in the machine-readable memory 206, such as a current or recent conversation 222, one or more previous conversation(s) 224, and a list of conversational chatbots (or other entities) 226. The data 210 may also include one or more token(s) 228 determined from the previous conversation(s) 224, classification data 230 used to classify one or more messages from the previous conversation(s) 224 and/or to classify one or more messages received from a conversational chatbot during a replayed conversation, and one or more determined task(s) 232 determined from the previous conversation(s) 224 and/or determined from one or more messages received from a conversational chatbot during a replayed conversation. Finally, the data 210 may also include one or more named entities 234 determined from the previous conversation(s) 224, one or more user preference(s) 236 determined from the previous conversation(s) 224, and one or more knowledge graphs 238 constructed from the determined task(s) 232, named entities 234, user preference(s) 236, and previous conversation(s) 224.

The messaging application 212 is configured to communicate and send messages with one or more of the conversation chatbot servers 108-112. The messaging application 212 may be implemented as a single-protocol instant messenger, a multi-protocol instant messenger, a web messenger, a mobile instant messaging client, an enterprise instant messaging client, or combinations thereof. Examples of instant messaging protocols that may be supported by the messaging application 212 include, but are not limited to, the Microsoft Notification Protocol, the Extensible Messaging and Presence Protocol (XMPP), the Yahoo! Messenger Protocol, the Skype Protocol, or any other such instant messaging protocol or combinations thereof.

In one embodiment, the user 106 establishes a connection with one or more of the conversational chatbots implemented by the conversational chatbot server 108-112 via the messaging application 212. As the user 106 sends messages to the conversational chatbot(s) and receives corresponding responses, the messaging application 212 stores the outgoing and incoming messages as a conversation, such as conversation 222. The messaging application 212 then further stores an association between the conversation 222 and the conversational chatbot that was communicating with the user 106. The conversation 222 is then added to a larger set of previous conversations 224, where each conversation of the previous conversations 224 is associated with a corresponding conversational chatbot.

In one embodiment, the client device 104 maintains a cached, or local copy, of a set of previous conversation(s) 224 for a specified time period, such as a day, a week, a month, or any other specified time period. The time period may be configured by the user 106 so that the user 106 can choose how many prior conversations are stored on the client device 104. In this embodiment, each of the conversations of the previous conversation(s) 224 may be associated with an identifier that indicates to the client device 104 when the specified time period has expired, such as a timer, a timestamp that indicates the creation date of the conversation, a timestamp that indicates when the time period expires for that particular conversation, or any other such identifier. Upon expiration of the time period associated with a particular conversation, the messaging application 212 may then upload (e.g., transfer) the conversation to the conversation processing server 116, which then stores the conversation, and any corresponding associations it may have, in a larger conversation database 118. In this manner, the client device 104 can make more efficient use of its internal storage by transferring older conversations to the conversation processing server 116. Further still, such transferred conversations may still be accessible by the messaging application 212 via a database access module 214. In an alternative embodiment, the conversations that the user 106 creates are locally stored on the client device 104 and may be transferred to the conversation processing server 116 at the user's 106 discretion. In some instances, the user 106 may choose to retain all of the previous conversation(s) 224 on the client device 104.

In addition, as the user 106 is communicating with the conversational chatbots, the messaging application 212 builds a corresponding list of these conversational chatbots 226. Furthermore, as the conversational chatbot servers 108-112 often expose a conversational chatbot through an API or other service, the messaging application 212 may add this conversational chatbot to the list of conversational chatbots 226 even if the user 106 has not had a prior conversation with the conversational chatbot. Additionally, and/or alternatively, the user 106 may manually add the conversational chatbot to the list of conversational chatbots 226. For example, the user 106 may add a conversational chatbot as a "contact" to a list of contacts that are maintained by the messaging application 212. In some instances, a conversational chatbot server may maintain a directory of conversational chatbots that the user 106 may add as a contact and, the user may add these conversational chatbots as contacts to the messaging application 212 for future conversations.

The database access module 214 is configured to access the conversation database 118 via the conversation processing server 116. In one embodiment, the database access module 214 communicates with the conversation database 118 using one or more database communication protocols, such as the Structured Query Language (SQL). By querying the conversation database 118, the database access module 214 can retrieve one or more prior conversations that the user 106 may have had with other conversational chatbots. Additionally, the database access module 214 may request that the conversation processing server 116 update the conversation database 118 with one or more conversation(s) that are stored on the client device 104.

The conversation selection module 216 is configured to present a selection of one or more of the previous conversation(s) 224 that the user 106 desires to replay with a particular entity, such as a conversational chatbot or human customer service representative. In one embodiment, the conversation selection module 216 presents a graphical user interface having one or more selectable elements, such as the previous conversation(s) 224, that the user 106 may select. Where the previous conversation(s) have been communicated to the conversation database 118, the conversation selection module 216 may use or invoke the database access module 214 to retrieve a list of the previous conversation(s) that reside on the conversation database 118. Using the conversation selection module 216, the user 106 then selects a previous conversation that the user 106 desires to replay with another entity via the messaging application 212.

In addition to selecting the previous conversation using the conversation selection 216, the user 106 also selects whether the replayed conversation is to be conducted passively or actively. As mentioned previously, a passive replay is one where the user 106 allows the response generator 220 and the message application 212 to communicate with a conversational chatbot on his or her behalf. In some instances, the user may be prompted to provide some input when there is an input missing or when disambiguation or consent is needed. For example, the user 106 may be prompted to provide missing information, some disambiguation as to a particular word or phrase, or for consent and/or authorization. With an active replay, the user 106 leads the conversation and the response generator 220 generates suggested responses (based on previous conversation) available to the user 106, at each turn of the conversation, which the user 106 may use or reject. Unlike a passive replay, in an active replay, the messaging application 212 displays a prompt to the user 106 for each response communicated to the selected entity (e.g., the conversational chatbot or the human customer service representative) during the replay of the selected conversation.

In one embodiment, the selected conversation is processed and analyzed for one or more conversation attributes so that the messaging application 212 can conduct a subsequent conversation with another conversational chatbot. An initial set of processing and analysis is performed by the NLP extraction module 218. In an alternative embodiment, the NLP extraction module 218 processes a conversation as the user 106 completes the conversation. In this embodiment, processing a conversation as it is completed reduces the time that the user 106 spends later on waiting for the NLP extraction module 218 to process a conversation that the user selects using the conversation selection module 216. the user 106 conducts are processed by the NLP extraction module 218 as the user 106 completes his or her conversations The NLP extraction module 218 is configured to parse and extract information from selected conversation. In one embodiment, the NLP extraction module 218 extracts one or more tasks from the selected conversation, one or more named entities (e.g., a starting city, a destination, a date of journey, and other such named entities), and one or more user preferences. To perform these and other operations, the NLP extraction module 218 includes a number of sub-modules.

Figure 3:
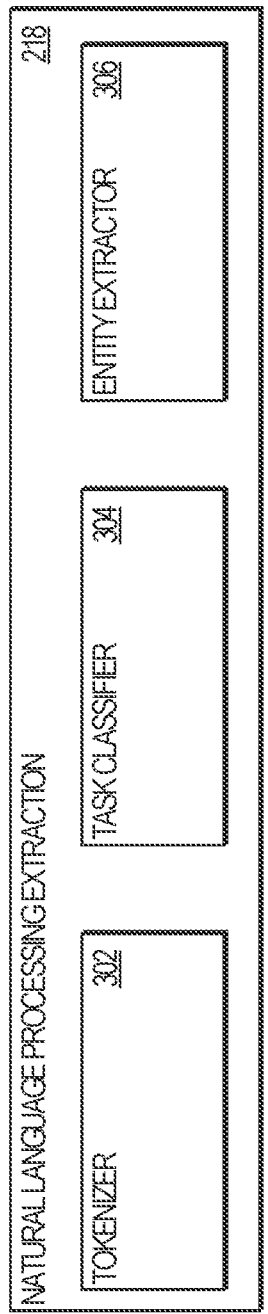
FIG. 3 is a block diagram of a natural language processing extraction module implemented by the client device in accordance with an example embodiment.

FIG. 3 is a block diagram of the NLP extraction module 218 implemented by the client device 104 in accordance with an example embodiment. In one embodiment, the NLP extraction module 218 includes a tokenizer 302, a task classifier 304, and an entity extractor 306. Although illustrated as being implemented by the client device 104, the NLP extraction module 218 may also be implemented by the conversation processing server 116.

The tokenizer 302 is configured to tokenize a message provided by the messaging application 212. The message provided by the messaging application 212 may include a message from the selected previous conversation (e.g., a message selected from one or more of the previous conversation(s) 224) or a message received from a conversational chatbot during a replayed conversation. The tokenizer 302 may receive different inputs from different modules 208 of the client device 104.

In one embodiment, the tokenizer 302 is implemented using a tokenizing library or other tokenizing function integrated with a computer-programming or scripting language. For example, the tokenizer 302 may be the "tokenizer" function for the computer-programming language C++ provided by Boost.org, which is available online and through the Internet. In another embodiment, the tokenizer 302 is implemented as the StringTokenizer class provided by the JAVA computer-programming language. The tokenizer 302 tokenizes an input message (e.g., from a selected previous conversation or from a conversation being replayed) to generate one or more of the token(s) 228. In this regard, each of the token(s) 228 may be word (e.g., one or more alphanumeric characters) where the tokenizer 302 is configured to use a space character (e.g., " ") as a delimiter. For example, where the message is "Cheapest flight," the token(s) 228 of this message may include "Cheapest" and "flight." As another example, where the message is "You are confirmed for Flight 3702 from EWR," the token(s) 228 may include "You," "are," "confirmed," "for," "Flight," "3702," "from," and "EWR." Additionally, and/or alternatively, the tokenizer 302 may be configured to generate messages as tokens from the selected previous conversation using a period (e.g., ".") as a delimiter. Thus, token(s) 228 may also include individual messages. In this embodiment, the messages may be further processed to generate individual word token(s) 228. In this manner, the tokenizer 302 is configured to tokenize a selected previous conversation into individual words and/or individual messages.

The task classifier 304 is configured to determine one or more task(s) associated with a given message or conversation provided as input to the NLP extraction module 218. The task classifier 304 may be configured to determine the one or more task(s) for each individual message of a conversation or for the entire conversation. In one embodiment, the task classifier 304 uses the token(s) 228 as input in determining the one or more task(s). The task classifier 304 may be implemented using one or more classification and/or machine-modeling techniques including, but not limited to, decision trees, logistic regression, conditional random fields (CRF), deep learning, and other such machine-modeling techniques or combinations thereof. The task classifier 304 may reference training data, namely, classification data 230, to facilitate the identification of task(s) and/or feature(s) from the token(s) 228. The classification data 230 may include labeled and/or training data that was previously labeled by one or more human operators.

In general, a task indicates the objective that the user is attempting to accomplish during a given conversation, such as arrange a flight, schedule a reservation, order food, set up a recording, or other such task. The task classifier 304 may identify tasks on a per message basis, such as where a conversational chatbot is provided responses to a conversation being replayed; or on a conversation basis, such as where one or more messages are provided as tokens to the task classifier 304; or as a combination of the two for any given conversation. The output from the task classifier 304 includes one or more determined tasks and these determined tasks may be stored as determined task(s) 232. As discussed below, a determined task is used by the response generator 220 in generating a response to a message received from a conversational chatbot during the replay of a selected conversation.

In addition to the determined tasks(s) 232, the task classifier 304 may also determine one or more user preferences for a given message and/or conversation. In this regard, a user preference may be considered as a sub-task that further describes, or modifies, the initially determined task. The initially determined task may be used as a feature input to the task classifier 304 for determining the sub-task (e.g., the user preference). For example, where the task classifier 304 determines that a task for a given message or conversation is "purchase airplane ticket," the task classifier 304 may then further determine a sub-task of "cheapest" or "shortest" for the given message using the initially determined "purchase airplane ticket" as a feature for the task classifier 304. As another example, where the task classifier 304 determines that a task for a given message or conversation is "order a pizza," the task classifier may then further determine a sub-task of "pepperoni" or "large" as a sub-task using the task of "order a pizza" as a feature input. In this manner, the task classifier 304 further determines one or more sub-tasks (e.g., user preferences) for a given message and/or conversation. The sub-tasks that are determined by the task classifier 304 are stored as the user preference(s) 236.

The entity extractor 306 is configured to extract one or more named entities from a conversation, which may be processed as a whole or on a per message basis. In one embodiment, the entity extractor 306 initiates the tokenizer 302 to tokenize a given message and/or conversation to generate the token(s) 228. In another embodiment, the token(s) 228 have already been determined and are provided to the entity extractor 306 as input associated with a corresponding message and/or conversation.

In general, a named entity refers a value or answer that the user 106 may provide to a conversational chatbot in response to a question that the conversational chatbot may ask. Typically, a named entity is a generic noun (e.g., "flight," "pizza," etc.) or a proper noun (e.g., "California," "New York City," etc.). To determine one or more named entities from a given message and/or conversation, the entity extractor 306 may implement various text recognition techniques including approximate string matching, one or more regular expressions (e.g., for recognizing dates, times, and/or other words that may have a particular format or syntax), exact matching, any other text recognition techniques, or combinations thereof. When a named entity is determined, the entity extractor 306 may then further determine a type associated with the named entity, such as "timestamp," "date," "string," or other such type. In one embodiment, the type is determined according to how the named entity was determined. For example, each of the matching techniques may be associated with an entity type that assigns a type to the named entity as the named entity is determined. The entity extractor 306 then stores the named entities and their associated types as the named entities 234.

Having the determined task(s) 232, the named entities 234, and the user preference(s) 236, the NLP extraction module 218 then generates a knowledge graph for a conversation (e.g., the current conversation 222 or one or more of the previous conversation(s) 224) that associates the various conversation attributes (e.g., the determined task(s) 232, the named entities 234, and the user preference(s) 236) with each other and with the given conversation. Thus, when the given conversation is then referenced by the response generator 220, the response generator 220 can readily determine the various conversation attributes when provided with similar conversation attributes determined from a conversation being replayed, either passively or actively. The knowledge graph for a given conversation is stored in the knowledge graph(s) 238 and, in one embodiment, is implemented as a two-dimensional table and/or array (e.g., a lookup table), where the rows of the two-dimensional table represent conversations and the columns of the table represent the conversation attributes.

Figure 4:
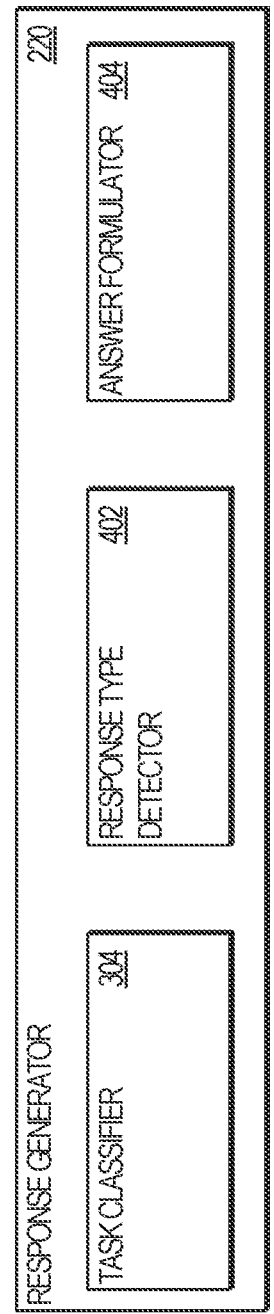
FIG. 4 is a block diagram of a response generator implemented by the client device in accordance with an example embodiment.

Using the knowledge graph(s) 228, the response generator 220 is configured to replay a selected previous conversation with a selected entity (e.g., a conversational chatbot or other entity) according to a selected mode (e.g., a passive mode or an active mode). FIG. 4 is a block diagram of the response generator 220 implemented by the client device 104 in accordance with an example embodiment. In one embodiment, the response generator 220 includes the task classifier 304, a response type detector 402, and an answer formulator 404.

To replay a selected conversation, the response generator 220 generates responses to one or more messages received by the messaging application 212 from a conversational chatbot and/or human customer service representative. The response generator 220 generates these responses based on the determined task(s) 232, the named entities 234, and the user preference(s) 236.

Initially, the response generator 220 uses the task classifier 304 to classify a task and/or user preference associated with a received message. For example, the task classifier 304 may determine whether the task for the received message is a "Yes" or "No" type task (e.g., "Do you want to book a return ticket?"), a task indicating that the message required an answer to "when," "who," "what," or "where" (e.g., "When do you want to depart for Paris?"), a task indicating a task completion (e.g., "The ticket has been emailed to you."), or other such task or combination of task(s). As discussed above, the task classifier 304 may leverage classification data 230 and one or more machine-learning algorithms to determine the task(s) and/or user preference(s) associated with a received message.

In some circumstances, the task classifier 304 may be unable to determine a task with an associated message. When this occurs, the task classifier 304 may generate a message or prompt for the messaging application 212, which is then displayed to the user 106. The message or prompt may request that the user 106 provide the task and/or user preference for the received message.

Having determined the task associated with the message, the response generator 220 then identifies a response type associated with the received message. Accordingly, the response generator 220 includes, in one embodiment, a response type detector 402 configured to determine the response type. In this regard, the response type indicates the type of response that the conversational chatbot expects in reply to the received message.

In one embodiment, each task determined by the task classifier 304 is associated with a response type. For example, the response generator 220 may include a two-dimensional table where rows of the two-dimensional table are determinable tasks and one or more columns represent a response type. The response type detector 402 may reference the two-dimensional table with the determined task to determine the corresponding response type. Response types include, but are not limited to, an affirmation type (e.g., "Yes" or "No"), a timestamp type (e.g., "When do you want to depart for Paris?" or "What's your date of birth?"), a location type (e.g., "Where do you want the driver to pick you up?"), a string type (e.g., "What size pizza would you like?" or "What day of the week do you prefer?"), an integer type (e.g., "What is your starting minimum bid?") or other such response types.

Having determined the response type, the response generator 220 then determines a response to the received message. In one embodiment, the answer formulator 404 is configured to generate a response to the received message. The answer formulator 404 may reference the knowledge graph 238 associated with the selected previous conversation to identify a response having a task similar or identical to the determined task for the received message of the current conversation. The answer formulator 404 may then obtain one or more of the named entities 234 associated with the response having the similar or identical task having an entity type that matches with the determined response type. The answer formulator 404 may then rank the obtained named entities 234 using one or more string matching techniques, such as cosine similarity and/or n-gram similarity, to determine a similarity value between the current conversational chatbot message and the messages of the conversational chatbot from the conversation being replayed. The answer formulator 404 may then select the highest ranked obtain named entity as the response to be communicated to the conversational chatbot for the current message. Determining the response type for the current message ensures that the selected named entity has the same, or similar, entity type as the expected response. This determination may help to prevent the answer formulator 404 from formulating a nonsensical response to the current message.

In some instances, the answer formulator 404 may be unable to determine a response type from the current message received from the conversational chatbot. In this instance, the answer formulator 404 may still determine a similarity value between the received message and the previously received messages of the previously selected conversation. Using the highest similarity value (e.g., indicating that the received message and the previously received message are the most similar), the answer formulator 404 then obtains those named entities 234 that are associated with the previously received, and most similar, message. The answer formulator 404 may then communicate a display or prompt to the messaging application 212 to request that the user 106 provide input that confirms that the obtained named entities 234 are the named entities to be used in a reply to the current message. In this manner, even in instances where the answer formulator 404 is unable to determine a response type, the answer formulator 404 can still provide a response to the current message based on user input.

Figure 5:
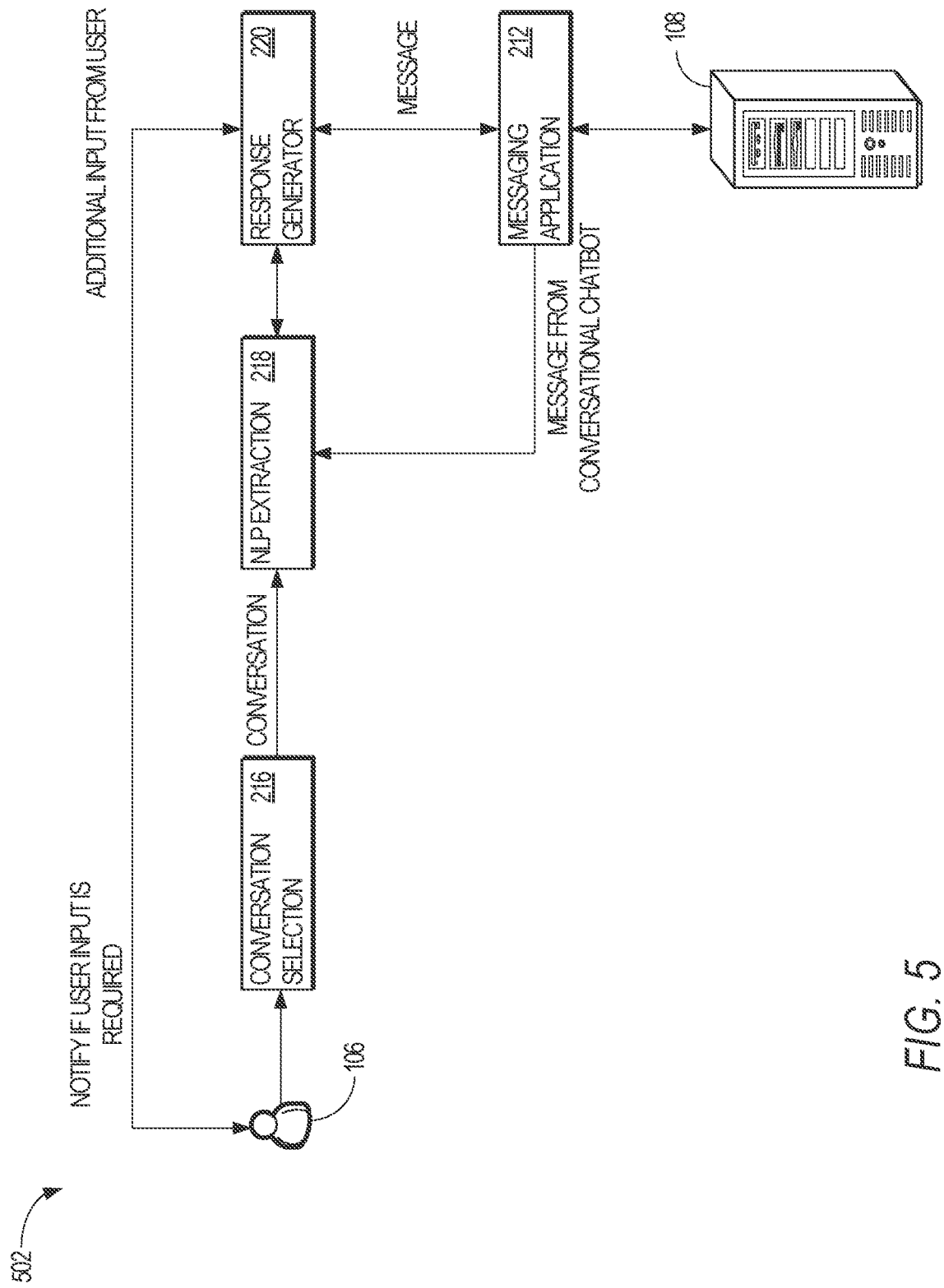
FIG. 5 illustrates an interaction diagram of the components of the client device of FIG. 1 according to an example embodiment, where a replay mode of the conversation is performed in a passive mode.

FIG. 5 illustrates an interaction diagram 502 of the components of the client device 104 of FIG. 1 according to an example embodiment, where the replay mode of the conversation is a passive mode. As shown in FIG. 5, the user 106 interacts with the conversation module 216 to select a previously conducted conversation. The user 106 may further select the entity to replay the conversation with and the replay mode of the conversation. In the example shown in FIG. 5, the entity is the conversational chatbot provided the conversational chatbot server 108 and the replay mode is a passive replay mode.

The conversation selection module 216 then interacts with the NLP extraction module 218 to extract the various conversation attributes (e.g., tasks, named entities, and user preferences) from the selected, and previously conducted, conversation. During the conversation with the conversational chatbot, the messaging application 212 may receive a message from the conversational chatbot and, in turn, communicate such message to the NLP extraction module 218 to extract the various conversation attributes and to the response generator 220 to generate an appropriate response (e.g., via the answer formulator 404). Because the replay mode is a passive replay mode, the response generator 220 may display a query or prompt to the user 106 in instances where the answer formulator 404 is unable to generate an appropriate response, such as when the answer formulator 404 is unable to determine a response type for the message sent by the conversational chatbot. For example, the answer formulator 404 may request that the user 106 provide the response type for the received message.

Additionally, and/or alternatively, the answer formulator 404 may generate a recommended response regardless of the response type, and then request that the messaging application 212 display a prompt or query to the user 106 requesting that the user 106 confirm that the recommended response be sent to the conversational chatbot. In this manner, the passive mode of replaying a selected, and previously conducted, conversation requires minimal user 106 input and is mostly an automated process. This allows the user 106 to engage in other activities or perform other tasks while the messaging application 212 is engaged with the conversational chatbot.

Figure 6:
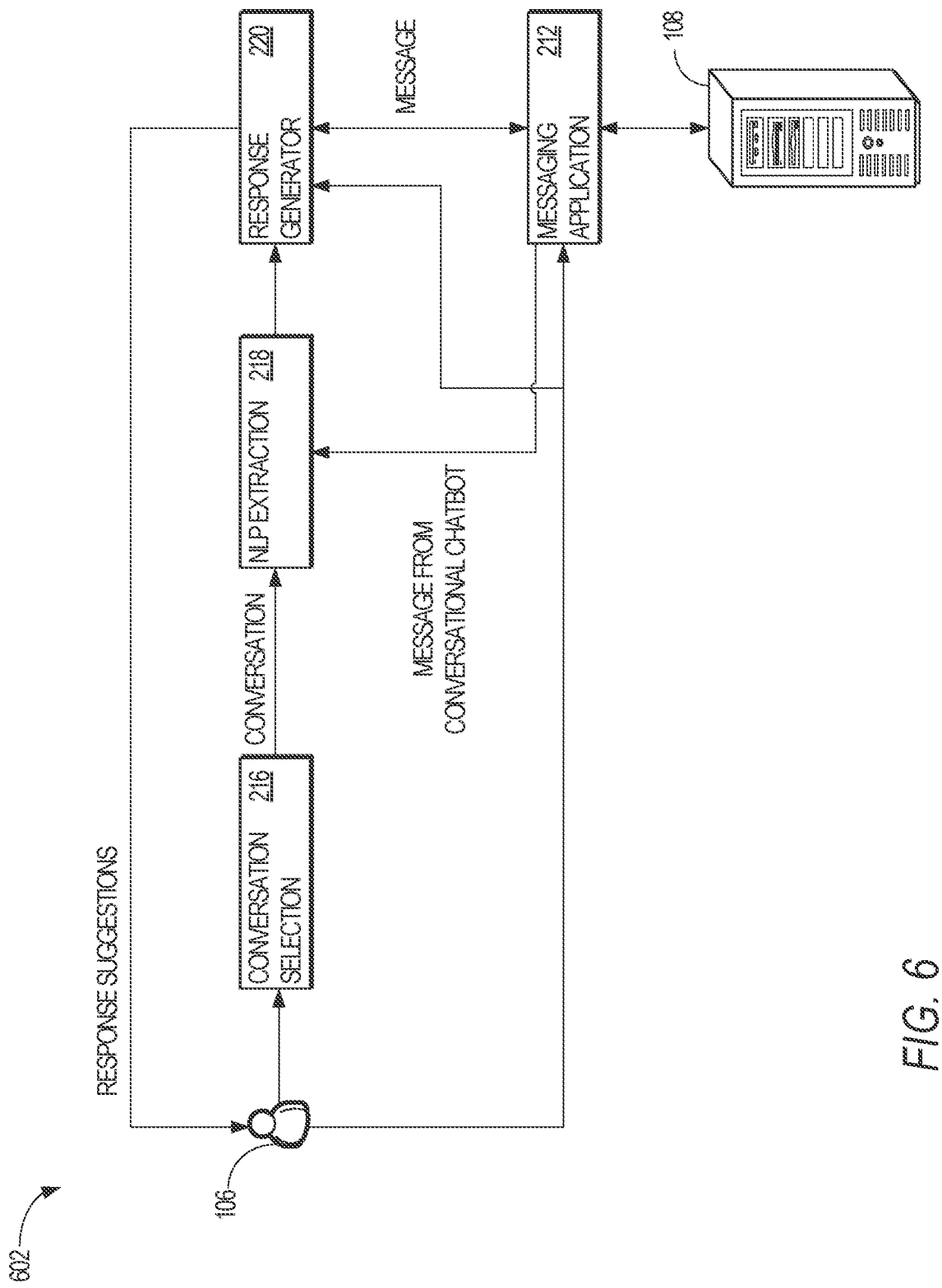
FIG. 6 illustrates an interaction diagram of the components of the client device of FIG. 1 according to an example embodiment, where the replay mode of the conversation is performed in an active mode.

FIG. 6 illustrates an interaction diagram 602 of the components of the client device 104 of FIG. 1 according to an example embodiment, where the replay mode of the conversation is an active mode. Similar to the passive mode illustrated in FIG. 5, the user 106 selects a previously conducted conversation selection module 216, an entity with which to conduct the replayed conversation, and a replay mode of the conversation. Similarly, the NLP extraction module 218 determines conversation attributes from received messages and the response generator 220 generates recommended responses based on the determined conversation attributes.

However, unlike the passive mode, the messaging application 212 and the response generator 220 query and/or display a prompt to the user 106 when messages are received from the conversational chatbot instantiated by the conversational chatbot server 108, and request that the user 106 select a recommended response that the response generator 220 has generated. The selected response is then communicated to the conversational chatbot via the messaging application 212. In this manner, although the conversation is relatively automated, the messaging application 212 and the response generator 220 request that the user 106 provide input each time a message is received from the conversational chatbot. The active mode may be used in instances where the user 106 is unfamiliar with the conversational chatbot, and thus prefers to review recommended responses to ensure that the recommended responses are responsive to the messages communicated by the conversational chatbot.

Figure 7A:
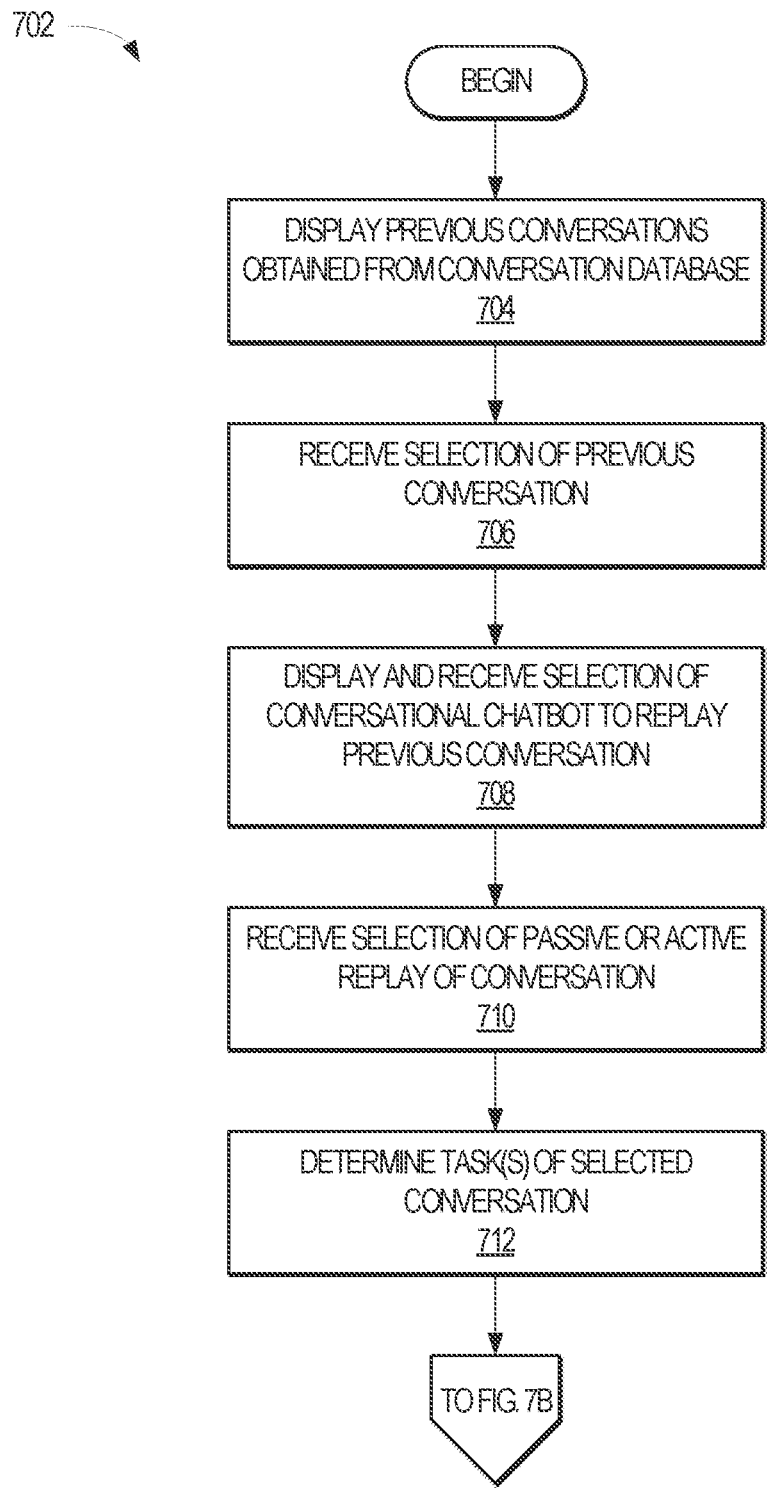
FIG. 7A-7B illustrates a method, in accordance with an example embodiment, for replaying a conversation with a conversational chatbot.
Figure 7B:
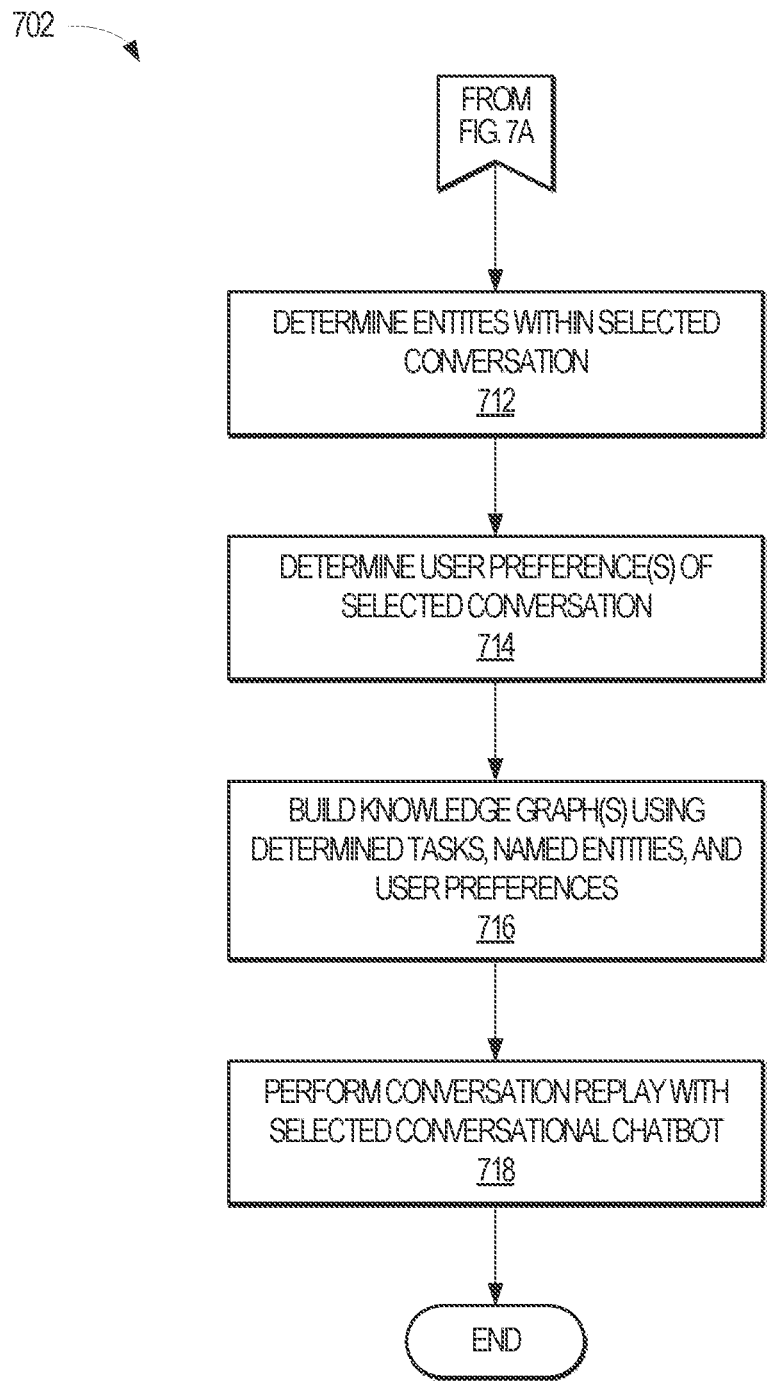

FIG. 7A-7B illustrates a method 702, in accordance with an example embodiment, for replaying a conversation with a conversational chatbot. The method 702 may be implemented by one or more of the modules 208 illustrated in FIG. 1 or FIG. 2 and is discussed by way of reference thereto.

Referring initially to FIG. 7A, the method 702 begins with a presumption that the client device 104 and/or the conversation processing server 116 includes a set of previously conducted conversations between the user 106 and one or more entities (e.g., one or more conversational chatbots and/or one or more human customer service representatives). Accordingly, the user 106 may engage the messaging application 212 to instantiate the conversation selection module 216, which then displays one or more previously conducted conversations (Operation 704). The previously conducted conversations may be stored as the previous conversation(s) 224 or may be retrieved from a conversation database 118 communicatively coupled to a conversation processing server 116, which is communicatively coupled to the client device 104 and accessible by the messaging application 212.

The user 106 then selects a conversation to be replayed by the messaging application 212 (Operation 706), an entity (e.g., a conversational chatbot or a human operator) that will be the recipient of the replayed conversation (Operation 708), and a replay mode that the messaging application 212 will replay the conversation (Operation 710).

The client device 104 may then determine one or more conversation attribute(s) associated with the selected conversation to be replayed. In an alternative embodiment, and as previously discussed, the determination of the conversation attribute(s) may be determined upon the termination and/or completion of the conversation rather than after a time that the conversation is selected to be replayed. To determine these conversation attribute(s), the client device 104 or the messaging application 212 executes the NLP extraction module 218. The NLP extraction module 218 may initially determine one or more task(s) associated with the selected conversation, where the task(s) are determined on a per message basis, a conversation basis, or both (Operation 712). As discussed previously with reference to FIG. 3, the task determination may be performed by a task classifier 304 of the NLP extraction module 218 and may store the determined task(s) as the determined task(s) 232.

Referring next to FIG. 7B, the NLP extraction module 218 then determines one or more named entities that are mentioned in the selected conversation (Operation 714). The determination of the named entities may be performed by the entity extractor 306 of the NLP extraction module 218. The named entities determined by the entity extractor 306 may be stored as the named entities 234. Thereafter, the task classifier 304 may then determine one or more user preference(s) associated with one or more messages and/or the selected previous conversation using the determined task(s) 232 as an input feature (Operation 714). Alternatively, task classifier 304 foregoes the use of the determined task(s) 232 as an input feature. The determined user preference(s) are then stored as the user preference(s) 236.

The messaging application 212 then builds one or more knowledge graph(s) 238 using the determined task(s) 232, the named entities 234, and the user preference(s) 236 (Operation 716). As explained with reference to FIG. 4, the response generator 220 may leverage the knowledge graph(s) 238 in generating responses to messages received by an entity (e.g., a conversational chatbot or human operator) during the replay of the selected previous conversation.

The messaging application 212 then performs the replay of the selected previous conversation with the selected entity (e.g., the conversational chatbot or human operator) according to the selected replay mode (Operation 718).

Although the foregoing method 702 is described as being implemented by one or more modules 208 of the client device 104, one or more of the foregoing operations may be performed by the conversation processing server 116, such as the task determination, named entity determination, and/or the user preference(s) determination. In this alternative embodiment, the conversation processing server 116 instantiates one or more of the modules 208, and the client device 104 communicates with the conversation processing server 116 to perform the various operations. In this alternative embodiment, the performance of one or more of the operations shown in FIG. 7 by the conversation processing server 116 reduces the computing load of the client device 104 and allows the client device 104 to perform other operations and/or tasks.

Figure 8:
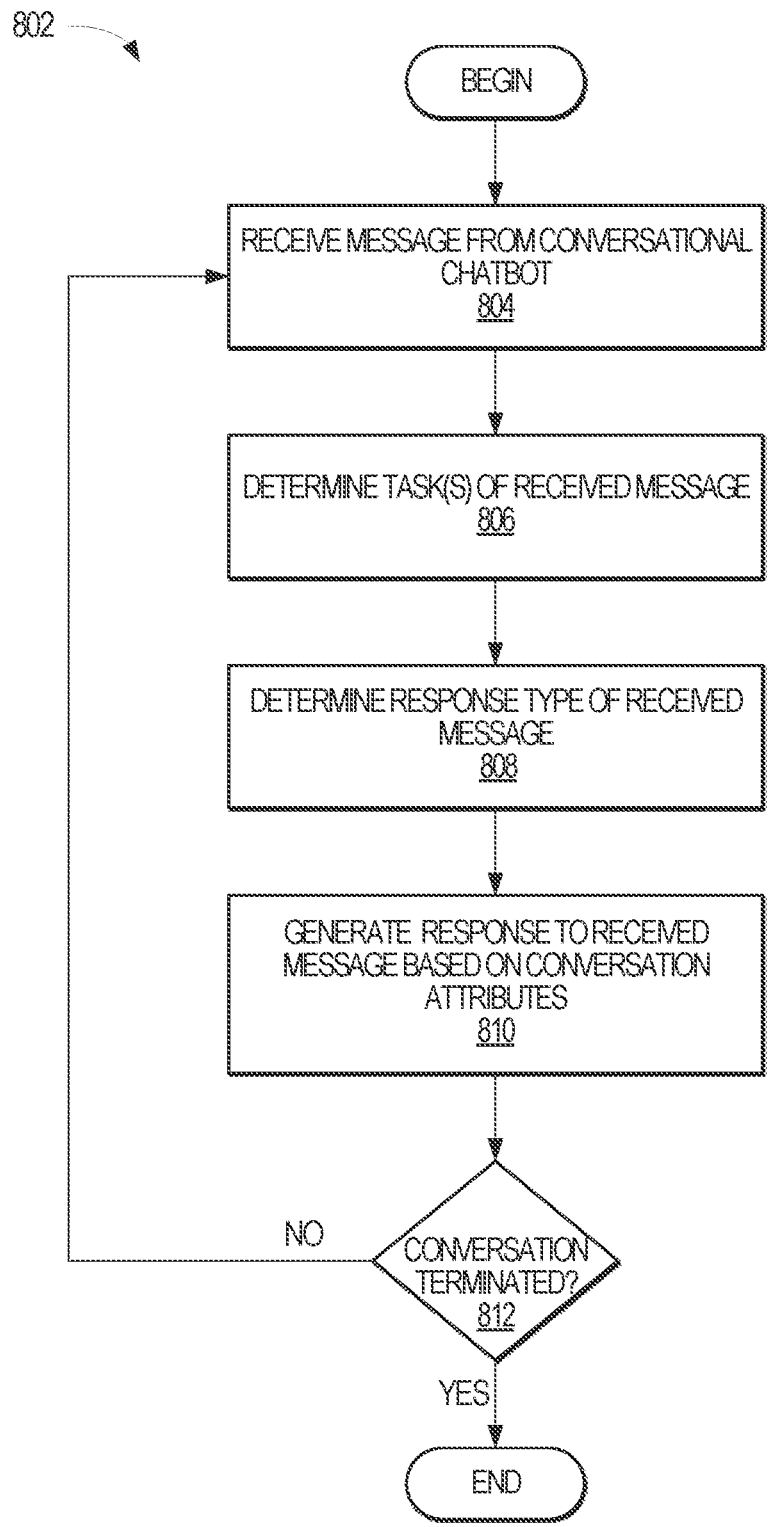
FIG. 8 illustrates a method, in accordance with an example embodiment, that details additional operations for replaying the conversation with the conversational chatbot according to the method illustrated in FIGS. 7A-7B.

FIG. 8 illustrates a method 802, in accordance with an example embodiment, that details additional operations for replaying the conversation with a conversational chatbot according to the method illustrated in FIGS. 7A-7B. The method 802 may be performed by one or more of the modules 208 and is discussed by way of reference thereto.

Initially, the messaging application 212 receives a message from the conversational chatbot (Operation 804). Using the received message, the messaging application 212 then instantiates the response generator 220 to analyze and process the received message. Accordingly, the response generator 220 executes the task classifier 304 to determine one or more task(s) associated with the received message (Operation 806). In one embodiment, the task classifier 304 leverages classification data 230 to determine the one or more task(s). The task classifier 304 stores the determine task(s) as the determined task(s) 232.

Thereafter, the response generator 220 determines the response type of the received message (Operation 808). As previously explained with reference to FIG. 4, the response generator 220 determines the response type of the received message to determine that a corresponding response is selected from potential response candidates. In one embodiment, the response generator 220 includes a response type detector 402 that determines the response type of the received message.

The response generator 220 then generates a response to the received message using the conversation attributes of the conversation being replayed (Operation 810). In one embodiment, the response generator 220 includes the answer formulator 404 to generate the response to the received message. As explained previously, the answer formulator 404 may leverage one or more of the named entities 234 and the response type of the received message to generate a response to the received message. Furthermore, the answer formulator 404 may involve the user 106 in sending a response to the received message depending on whether the user 106 selected the passive mode or the active mode for the conversation being replayed. Where the user selected a passive mode, the response generator 220 may request that the user 106 confirm to send the generated response where the answer formulator 404 has a problem, such as where the answer formulator 404 is unable to determine a response type for the received message or where multiple named entities are possible candidates for responding to the received message. Where the user selected an active mode, the response generator 220 may generate one or more recommended responses for the user 106 to review, and then request that the user 106 select one of the recommended responses. With the active mode, the response generator 220 may request that the user 106 select a recommended response for each message received from the conversational chatbot (or other entity).

The messaging application 212 then determines whether the replayed conversation has ended with the selected conversational chatbot or human operator (e.g., a human customer service representative) (Operation 812). In one embodiment, the messaging application 212 determines that the replayed conversation has ended when there are no further responses from the user 106 in the conversation being replayed, indicating that the user 106 completed the conversation from the last time it was conducted. In another embodiment, the messaging application 212 determines that the replayed conversation has ended when the task classifier 304 determines that the task associated with the received message from the conversational chatbot or human operator is a task completion message, indicating that the conversation completed successfully or unsuccessfully. In yet a further embodiment, the task classifier 304 may be trained with classification data 230 to discern whether the task completion message was a message indicating a successful completion of a determined task or a message indicating an unsuccessful completion of the determined task.

Where the messaging application 212 determines that the conversation has not yet terminated (e.g., the "NO" branch of Operation 812), the method 802 returns to Operation 804 for the messaging application 212 to receive another message from the conversational chatbot or human operator. Alternatively, where the messaging application 212 determines that the conversation has terminated (e.g., the "YES" branch of Operation 812), the method 802 ends and the messaging application 212 may inform the user 106 accordingly (e.g., by displaying a prompt, alert, or other message).

In this manner, this disclosure provides a replay mechanism that allows a user to replay one or more previously conducted conversations with a selected conversational chatbot (or other selected entity). Unlike conventional or traditional messaging applications, which typically require the user to be continuously engaged in a conversation with a conversational chatbot, the disclosed replay mechanism allows the user to attend to other matters or engage in other activities while the conversation is being replayed. Accordingly, one of the technical benefits provided by the disclosed replay mechanism is the advancement in messaging applications to support conversational replay rather than having the user be engaged with the conversation in real-time.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a stand-alone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Example Machine Architecture and Machine-Readable Medium

Figure 9:
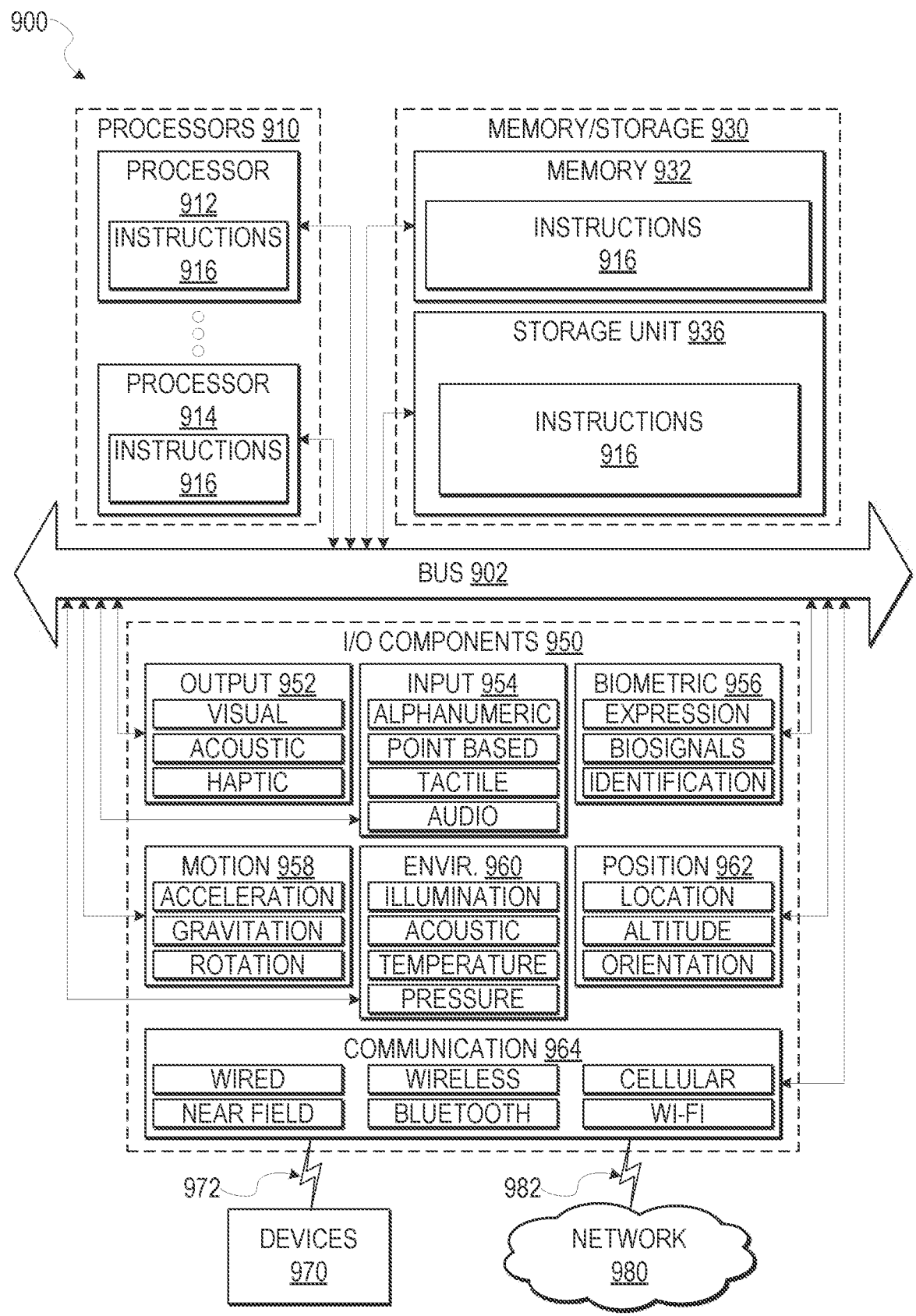
FIG. 9 is a diagrammatic representation of a machine in the example form of a computer system within which a set of instructions for causing the machine to perform any one or more of the methodologies discussed herein may be executed.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example, the instructions 916 may cause the machine 900 to execute the methods 702,802 illustrated in FIGS. 7A-7B and FIG. 8. Additionally, or alternatively, the instructions 916 may implement one or more of the modules 208 illustrated in FIG. 2. The instructions 916 transform the general, non-programmed machine into a particular machine programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory/storage 930, and I/O components 950, which may be configured to communicate with each other such as via a bus 902. In an example embodiment, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 912 and processor 914 that may execute instructions 916. The term "processor" is intended to include a multi-core processor that may comprise two or more independent processors (sometimes referred to as "cores") that may execute instructions 916 contemporaneously. Although FIG. 9 shows multiple processors 910, the machine 900 may include a single processor with a single core, a single processor with multiple cores (e.g., a multi-core process), multiple processors with a single core, multiple processors with multiples cores, or any combination thereof.

The memory/storage 930 may include a memory 932, such as a main memory, or other memory storage, and a storage unit 936, both accessible to the processors 910 such as via the bus 902. The storage unit 936 and memory 932 store the instructions 916 embodying any one or more of the methodologies or functions described herein. The instructions 916 may also reside, completely or partially, within the memory 932, within the storage unit 936, within at least one of the processors 910 (e.g., within the processor's cache memory), or any suitable combination thereof, during execution thereof by the machine 900. Accordingly, the memory 932, the storage unit 936, and the memory of processors 910 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 916. The term "machine-readable medium" shall also be taken to include any medium, or combination of multiple media, that is capable of storing instructions (e.g., instructions 916) for execution by a machine (e.g., machine 900), such that the instructions, when executed by one or more processors of the machine 900 (e.g., processors 910), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962 among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 962 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via coupling 982 and coupling 972 respectively. For example, the communication components 964 may include a network interface component or other suitable device to interface with the network 980. In further examples, communication components 964 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a Universal Serial Bus (USB)).

Moreover, the communication components 964 may detect identifiers or include components operable to detect identifiers. For example, the communication components 964 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as location via Internet Protocol (IP) geo-location, location via Wi-Fi® signal triangulation, location via detecting an NFC beacon signal that may indicate a particular location, and so forth.

Transmission Medium

In various example embodiments, one or more portions of the network 980 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network and the coupling 982 may be a Code Division Multiple Access (CDMA) connection, a Global System for Mobile communications (GSM) connection, or other type of cellular or wireless coupling. In this example, the coupling 982 may implement any of a variety of types of data transfer technology, such as Single Carrier Radio Transmission Technology (1×RTT), Evolution-Data Optimized (EVDO)

technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., hypertext transfer protocol (HTTP)). Similarly, the instructions 916 may be transmitted or received using a transmission medium via the coupling 972 (e.g., a peer-to-peer coupling) to devices 970. The term "transmission medium" shall be taken to include any intangible medium that is capable of storing, encoding, or carrying instructions 916 for execution by the machine 900, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

We claim:

1. A system for replaying a previously conducted conversation, the system comprising:
    a machine-readable memory storing computer-executable instructions; and
    one or more hardware processors in communication with the machine-readable memory that, having executed the computer-executable instructions, configures the system to:
    retrieve a plurality of conversations that are available to be used in a conversational replay;
    receive a selection of a conversation from the retrieved plurality of conversations to replay;
    receive a selection of an agent to replay the selected conversation;
    communicate, to a server communicatively coupled to the system, a request to determine at least one task, at least one named entity, and at least one user preference from the selected conversation;
    receive, from the server communicatively coupled to the system, the determined at least one task, the at least one named entity, and the at least one user preference;
    during a computer-assisted conversation with the selected agent, generate a plurality of responses based on the determined at least one task, the at least one named entity, and the at least one user preference.

2. The system of claim 1, wherein the system is further configured to determine a response type for a message received during the selected conversation with the selected agent, the response type indicating an expected response type to the message received during the selected conversation with the selected agent; and
    wherein the at least one named entity has an entity type that matches the determined response type.

3. The system of claim 1, wherein the system is further configured to:
    receive a selection of a passive mode or an active mode to replay the selected conversation to the selected agent;
    in response to the passive mode being selected, communicate at least one response of the plurality of responses to the selected agent without input from a user; and
    in response to the active mode being selected, present the at least one response of the plurality of responses as a suggested response before being communicated to the selected agent.

4. The system of claim 1, wherein the system is further configured to:
    display a plurality of conversational chatbots that are available to participate in the replay of the selected conversation; and
    receive a selection of a conversational chatbot from the plurality of conversational chatbots as the agent to participate in the replay of the selected conversation.

5. The system of claim 1, wherein the determined at least one task indicates an objective that was to be achieved during the selected conversation.

6. The system of claim 5, wherein the determined at least one user preference is a modifier that further defines the at least one task.

7. The system of claim 1, wherein the system is further configured to:
terminate the conversation with the selected agent based on a determination that a message received from the selected agent is associated with a task indicating a task completion.

8. A system for replaying a previously conducted conversation, the system comprising:
a machine-readable memory storing computer-executable instructions; and
one or more hardware processors in communication with the machine-readable memory that, having executed the computer-executable instructions, configures the system to:
retrieve a plurality of conversations that are available to be used in a conversational replay;
receive a selection of a conversation from the plurality of conversations to replay;
receive a selection of an agent to replay the selected conversation;
communicate, to a server communicatively coupled to the system, a request to determine at least one task, at least one named entity, and at least one user preference from the selected conversation;
determine, by the server, the at least one task, the at least one named entity, and the at least one user preference from the selected conversation;
receive, from the server, the determined the at least one task, the at least one named entity, and the at least one user preference from the selected conversation;
during a computer-assisted conversation with the selected agent, generate a plurality of responses based on the determined at least one task, at least one named entity, and the at least one user preference.

9. The system of claim 8, wherein the system is further configured to:
determine a response type for a received message, the response type indicating an expected response type to the received message; and
the at least one named entity has an entity type that matches the determined response type.

10. The system of claim 8, wherein the system is further configured to:
determine a plurality of named entities that are potential responses to a message received during the conversation with the selected agent, where each of the plurality of named entities is associated with a message from the selected conversation;
determine a plurality of similarity values by comparing (i) the message associated with each of the plurality of named entities and (ii) the message received during the selected conversation with the selected agent, each of the plurality of named entities being associated with a corresponding similarity value;
rank the plurality of named entities based on the determined plurality of similarity values; and
select the at least one named entity as a response to the received message based on the at least one named entity having a highest rank.

11. The system of claim 8, wherein the system is further configured to:
receive a selection of a passive mode or an active mode to replay the selected conversation to the selected agent;
in response to the passive mode being selected, communicate at least one first response of the plurality of responses to the selected agent without input from a user; and
in response to the active mode being selected, present at least one second response of the responses of the plurality of responses as a suggested response before being communicated to the selected agent.

12. The system of claim 8, wherein the system is further configured to:
display a plurality of conversational chatbots that are available to participate in the replay of the selected conversation; and
receive a selection of a conversational chatbot from the plurality of conversational chatbots as the agent to participate in the replay of the selected conversation.

13. The system of claim 8, wherein the system is further configured to:
terminate the conversation with the selected agent based on a determination that a message received from the selected agent is associated with a task indicating a task completion.

14. A method for replaying a previously conducted conversation, the method comprising:
retrieving a plurality of conversations that are available to be used in a conversational replay;
receiving a selection of a conversation from the retrieved plurality of conversations to replay;
receiving a selection of an agent to replay the selected conversation;
communicating, to a server, a request to determine at least one task, at least one named entity, and at least one user preference from the selected conversation;
receiving, from the server, the determined at least one task, the at least one named entity, and the at least one user preference;
generating, during a computer-assisted conversation with the selected agent, a plurality of responses based on the determined at least one task, the at least one named entity, and the at least one user preference.

15. The method of claim 14, further comprising determining a response type for a message received during the selected conversation with the selected agent, the response type indicating an expected response type to the message received during the selected conversation with the selected agent, wherein the at least one named entity has an entity type that matches the determined response type.

16. The method of claim 14, further comprising:
receiving a selection of a passive mode or an active mode to replay the selected conversation to the selected agent;
in response to the passive mode being selected, communicating at least one response of the plurality of responses to the selected agent without input from a user; and
in response to the active mode being selected, presenting the at least one response of the plurality of responses as a suggested response before being communicated to the selected agent.

17. The method of claim 14, further comprising:
displaying a plurality of conversational chatbots that are available to participate in the replay of the selected conversation; and receiving a selection of a conversational chatbot from the plurality of conversational chatbots as the agent to participate in the replay of the selected conversation.

18. The method of claim 14, wherein the determined at least one task indicates an objective that was to be achieved during the selected conversation.

19. The method of claim 18, wherein the determined at least one user preference is a modifier that further defines the at least one task.

20. The method of claim 14, further comprising:
terminating the conversation with the selected agent based on a determination that a message received from the selected agent is associated with a task indicating a task completion.

\* \* \* \* \*